United States Patent
Stewart

(10) Patent No.: US 8,215,717 B2
(45) Date of Patent: Jul. 10, 2012

(54) DUMP TRAILER

(75) Inventor: Larry L. Stewart, Cushing, OK (US)

(73) Assignee: All Right Steel, LLC, Cushing, OK (US)

( * ) Notice: Subject to any disclaimer, the term of this patent is extended or adjusted under 35 U.S.C. 154(b) by 0 days.

(21) Appl. No.: 13/126,807

(22) PCT Filed: Feb. 25, 2011

(86) PCT No.: PCT/US2011/026270
§ 371 (c)(1),
(2), (4) Date: Apr. 29, 2011

(87) PCT Pub. No.: WO2011/106662
PCT Pub. Date: Sep. 1, 2011

(65) Prior Publication Data
US 2012/0013167 A1    Jan. 19, 2012

Related U.S. Application Data

(60) Provisional application No. 61/308,743, filed on Feb. 26, 2010.

(51) Int. Cl.
*B60P 1/12* (2006.01)
(52) U.S. Cl. ............ 298/11; 298/2; 298/17 R; 298/17.5; 298/17.8
(58) Field of Classification Search .................... 298/11, 298/2, 17 R, 17.5, 17.8, 17 T; 280/47.17, 280/47.18, 47.26; 414/482
See application file for complete search history.

(56) References Cited

U.S. PATENT DOCUMENTS

| 595,056 A | 12/1897 | French |
| 1,942,319 A | 1/1934 | Wright |
| 3,977,726 A | 8/1976 | Prestayko |
| 4,511,181 A | 4/1985 | Schantz |
| 4,639,043 A | 1/1987 | Morissette |

(Continued)

FOREIGN PATENT DOCUMENTS

GB    690579    4/1953

(Continued)

OTHER PUBLICATIONS

ATV Equipment & Accessories, Jan. 19, 2010, www.horsestalls.com/atvequipment.htm.

(Continued)

*Primary Examiner* — Glenn Dayoan
*Assistant Examiner* — Sunsurraye Westbrook
(74) *Attorney, Agent, or Firm* — Matthew S. Gibson; McAfee & Taft

(57) ABSTRACT

A towable dump trailer is provided. The towable dump trailer comprises a first, second and third frame. The first frame comprises one or more sets of wheels. The second frame is attached to the tow vehicle and can be displaced horizontally relative to the first frame by the towing vehicle moving rearward or forward. The third frame provides a support frame for the trailer bed. The dump trailer is operated by immobilizing the first frame and causing the second frame to move horizontally relative to the first frame. This horizontal displacement causes the third frame to pivot as a result of one or more pivoting arms translating the horizontal movement to pivotal movement. The dump trailer can be configured to provide a dumping action by either forward or rearward horizontal displacement of the second frame relative to the first frame.

20 Claims, 18 Drawing Sheets

U.S. PATENT DOCUMENTS

| | | |
|---|---|---|
| 4,647,110 A | 3/1987 | McKee |
| 4,711,499 A | 12/1987 | Fortin |
| 4,889,390 A | 12/1989 | Campbell |
| 4,968,096 A | 11/1990 | Chattin |
| 5,452,942 A | 9/1995 | Brooks |
| 5,779,431 A | 7/1998 | Alm et al. |
| 6,099,232 A | 8/2000 | Dixon et al. |
| 6,238,166 B1 * | 5/2001 | Collier ............... 414/436 |
| 6,318,808 B1 * | 11/2001 | Shayne ............... 298/17 B |
| 6,755,479 B1 | 6/2004 | Meeks |
| 6,817,677 B1 * | 11/2004 | Beiler ............... 298/22 C |
| 6,817,825 B1 | 11/2004 | O'Hagen |
| 6,851,756 B2 * | 2/2005 | Pieschel ............... 298/2 |
| 7,390,065 B2 * | 6/2008 | Pieschel et al. ............... 298/2 |
| 7,431,143 B2 | 10/2008 | Hanhinen et al. |
| 7,552,818 B2 | 6/2009 | Makinen et al. |
| 2005/0253445 A1 | 11/2005 | Beiler et al. |
| 2007/0158162 A1 | 7/2007 | Makinen et al. |
| 2008/0211289 A1 | 9/2008 | Beiler et al. |

FOREIGN PATENT DOCUMENTS

| | | |
|---|---|---|
| GB | 1426069 | 2/1976 |
| WO | WO/2010/004615 | 1/2010 |

OTHER PUBLICATIONS

CAM Trailers, Jan. 21, 2010, www.allprowest.com.

* cited by examiner

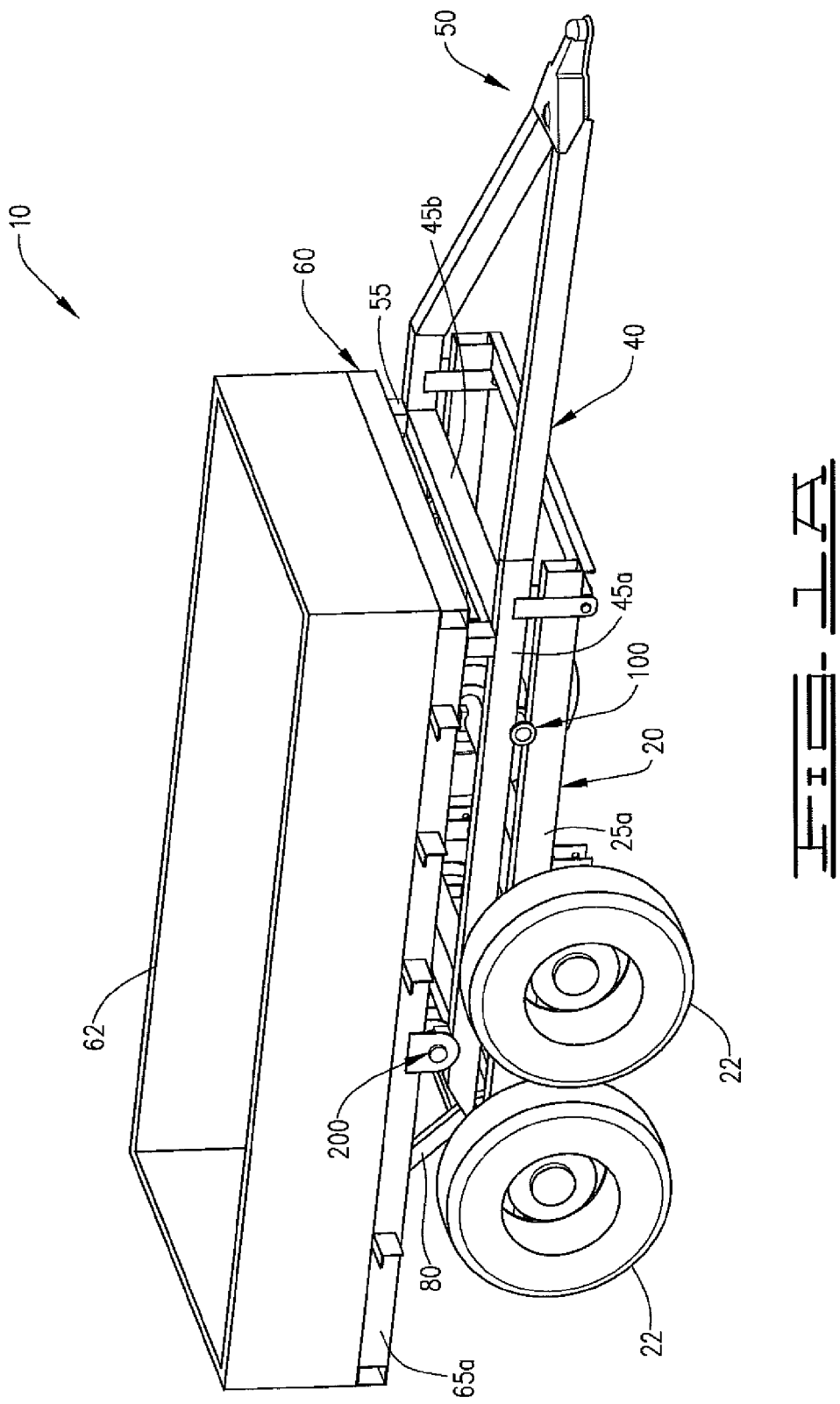

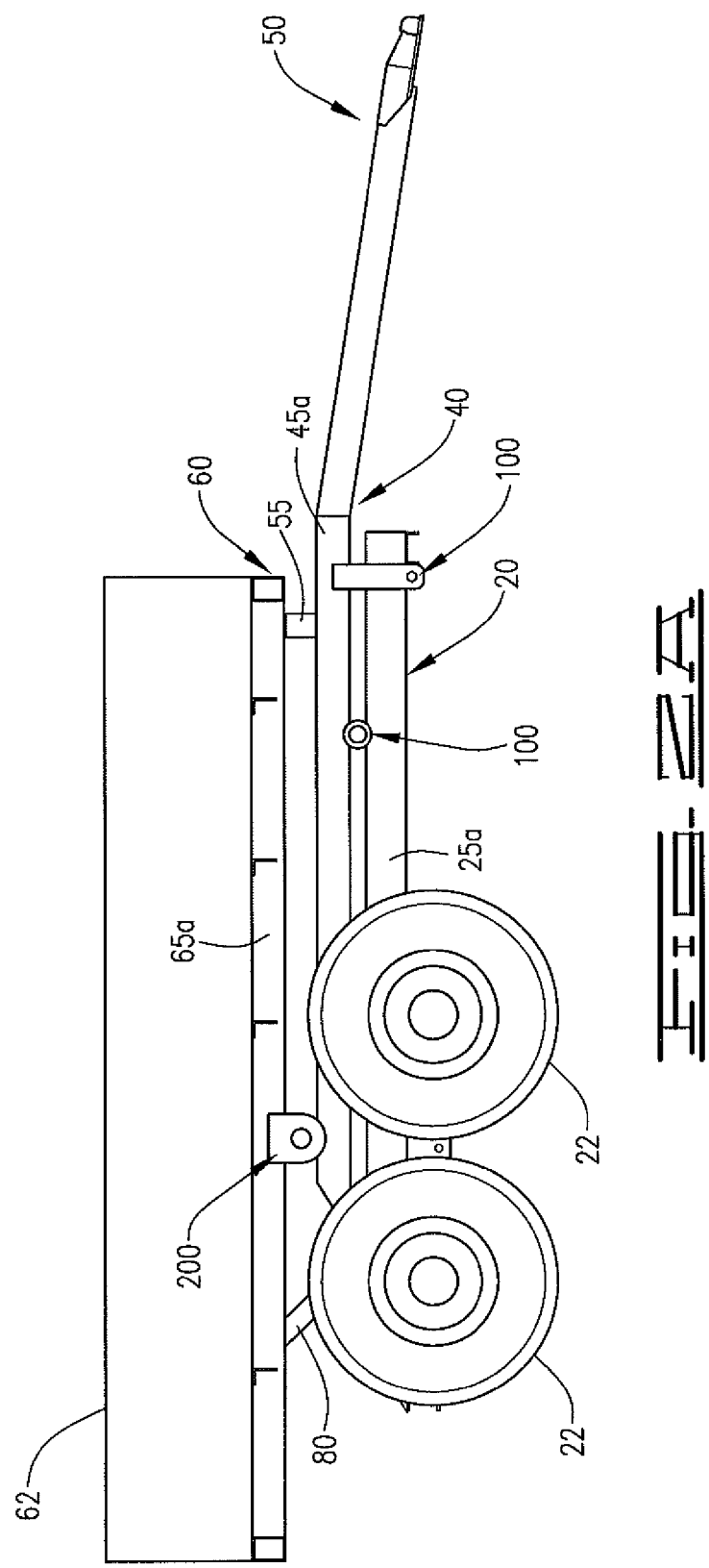

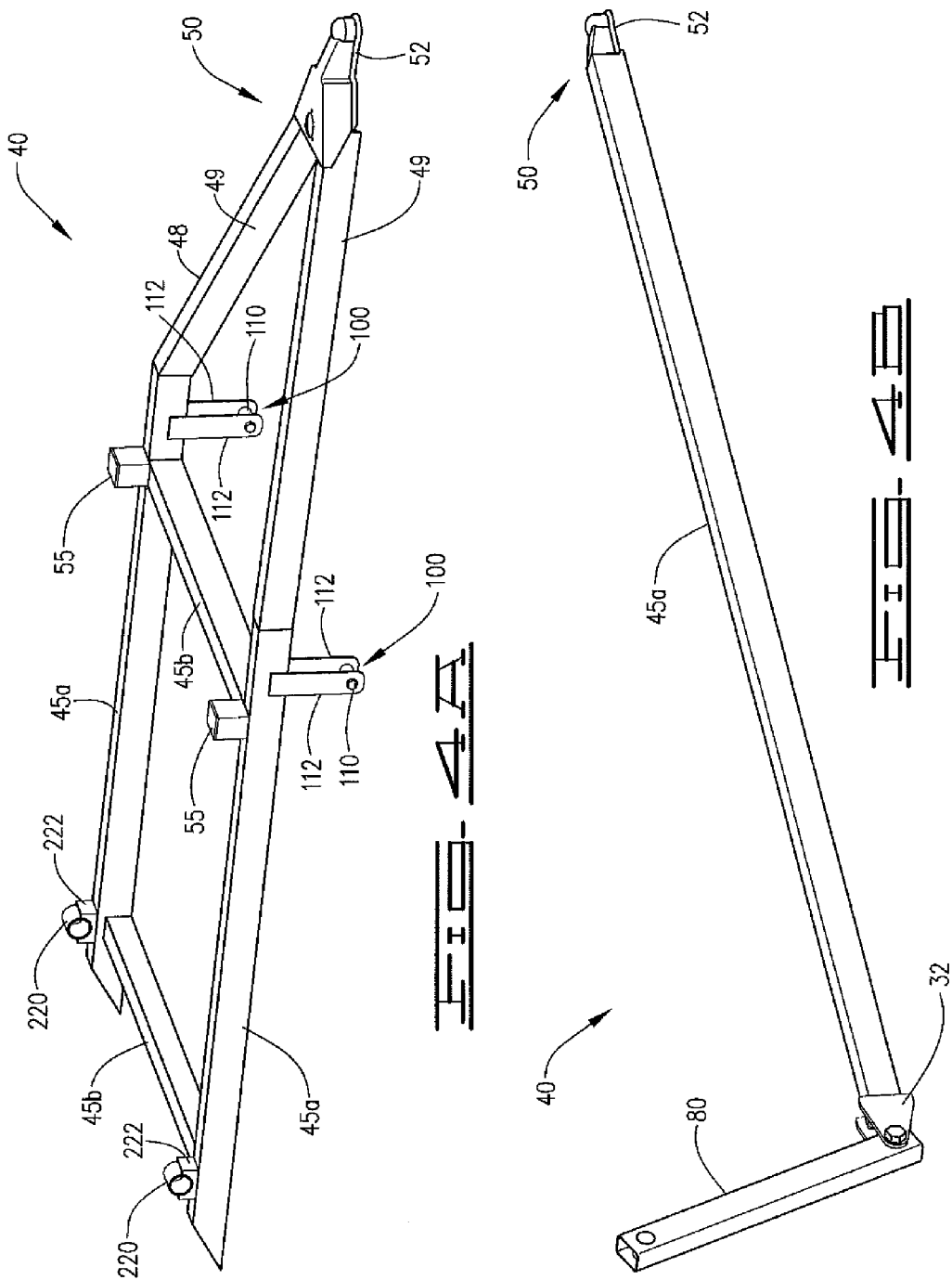

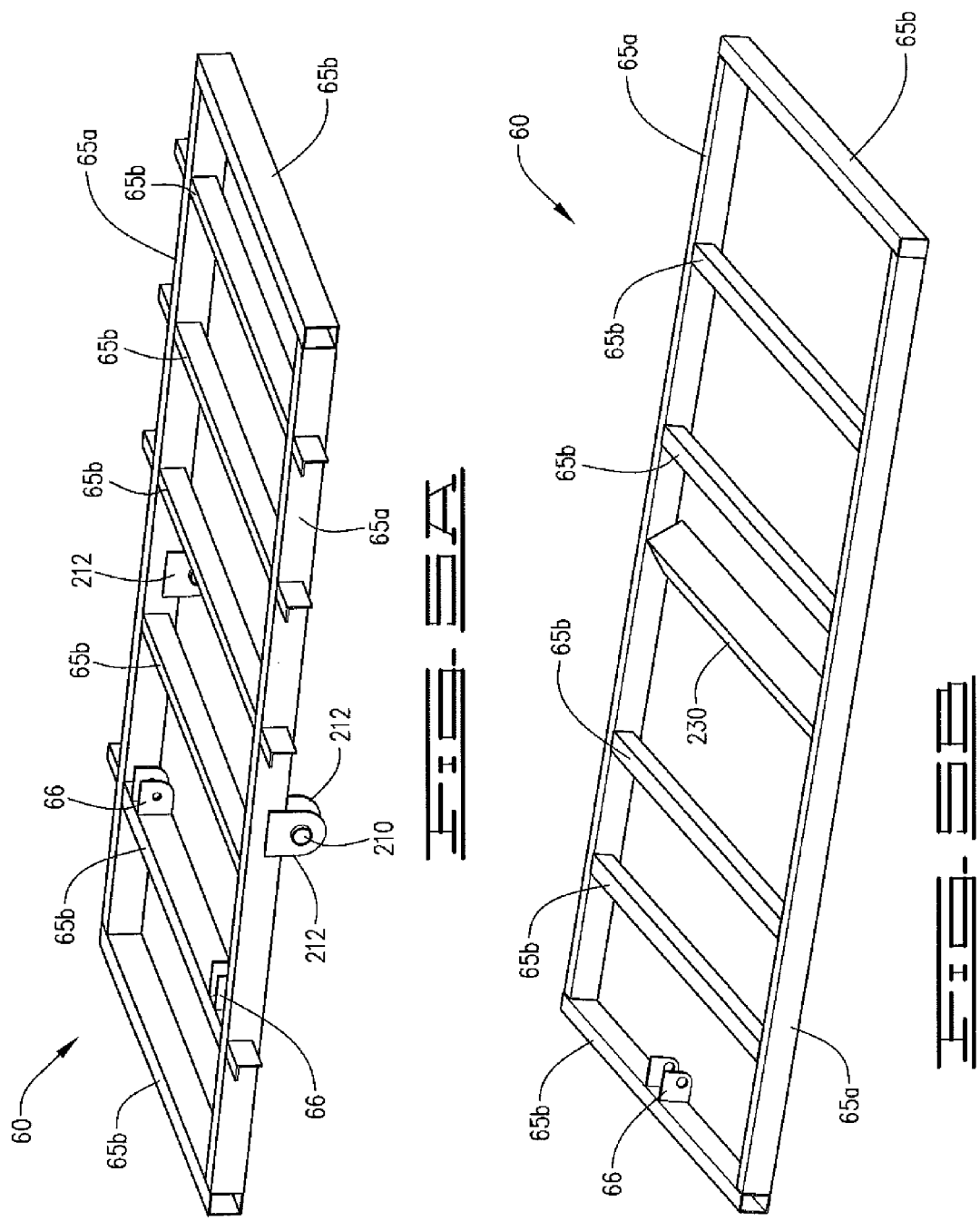

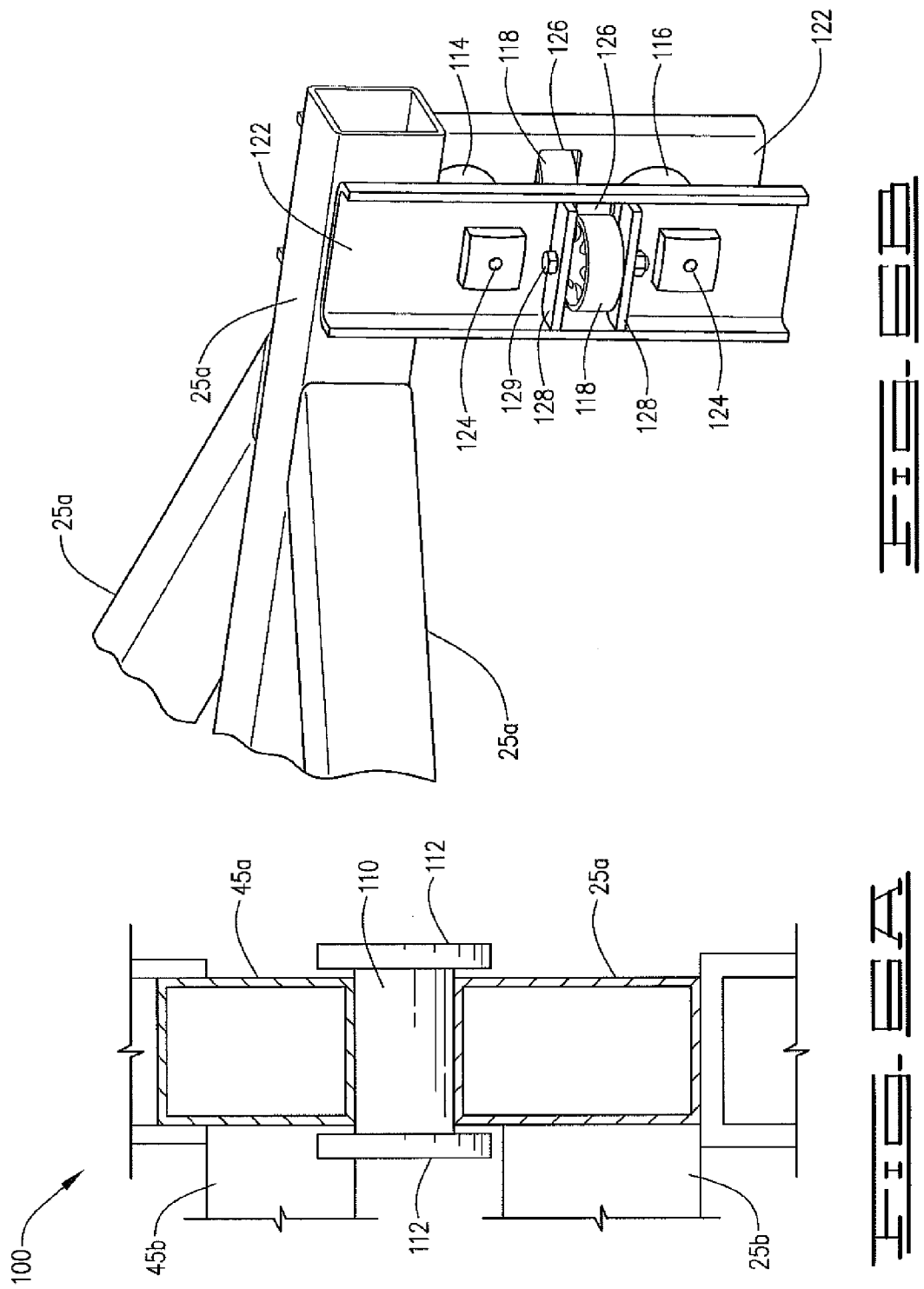

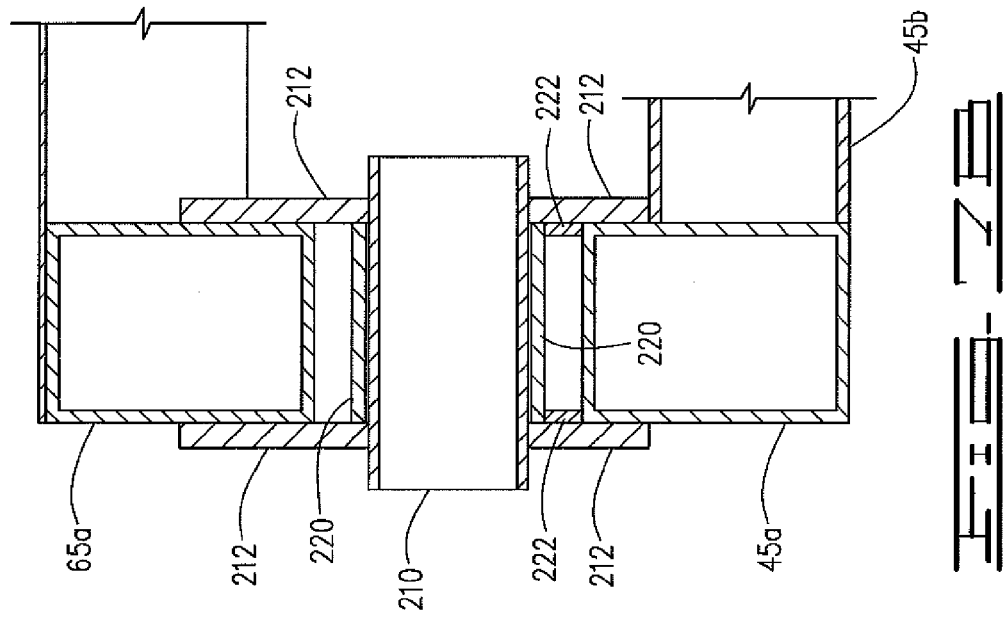
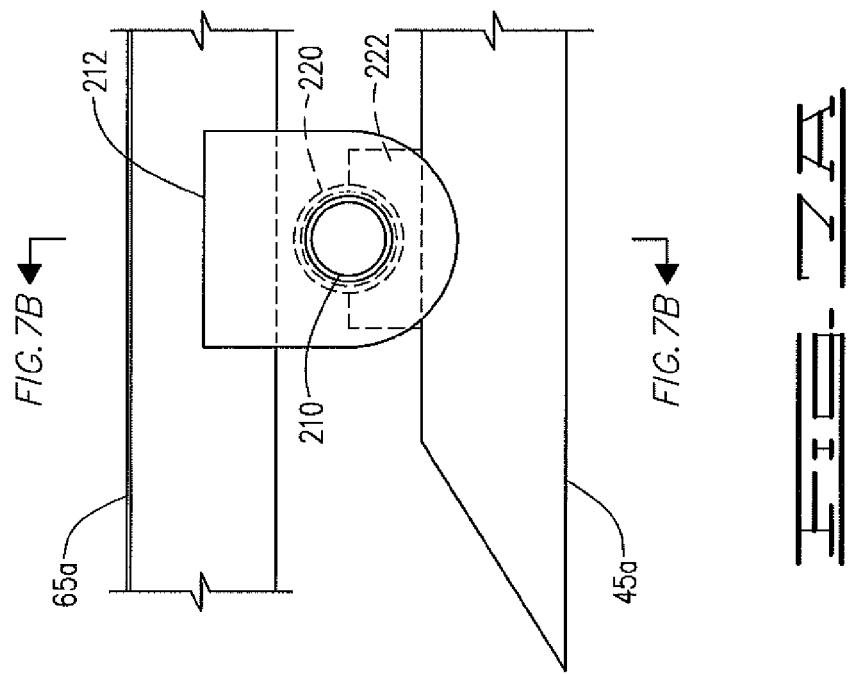

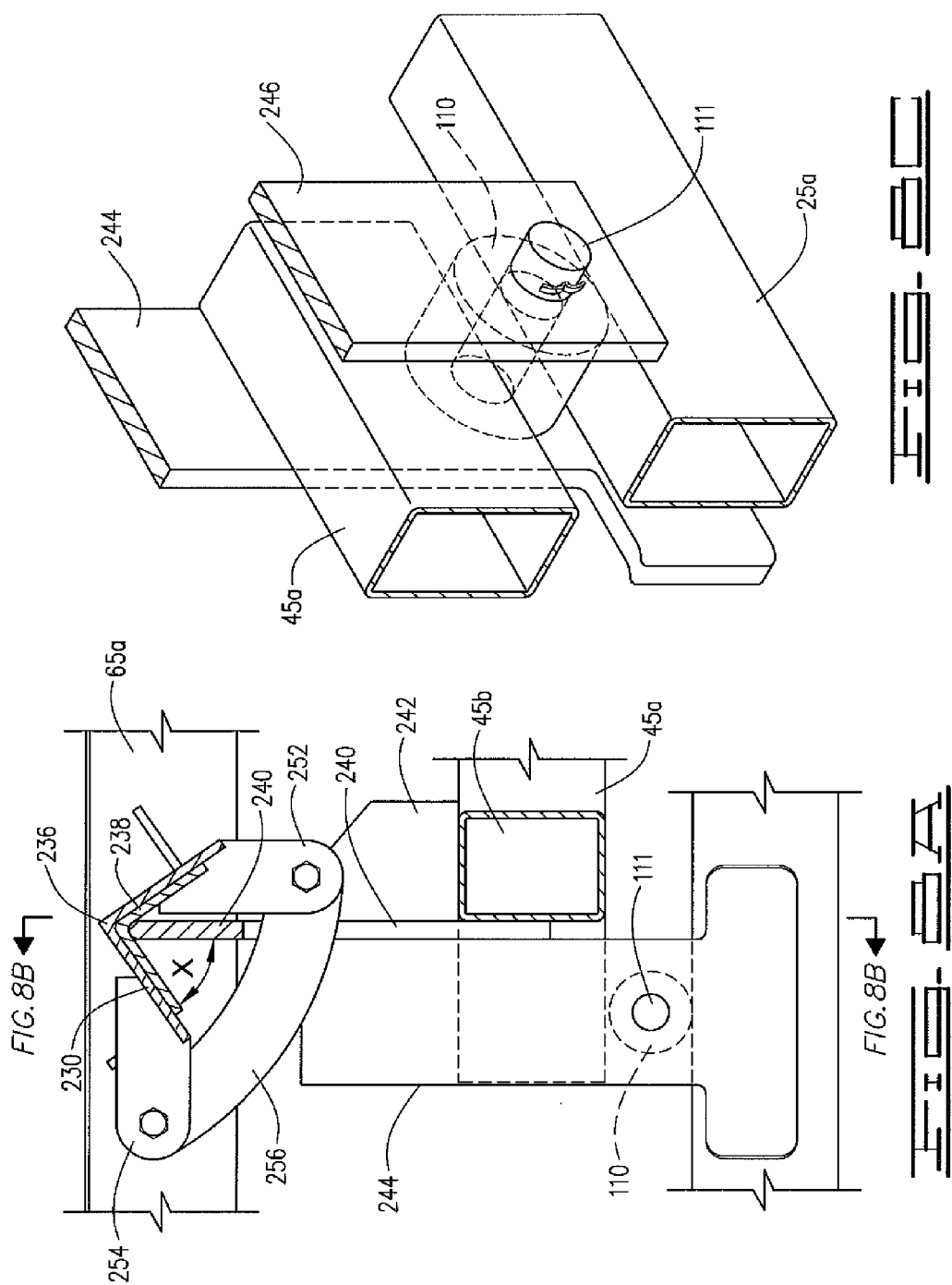

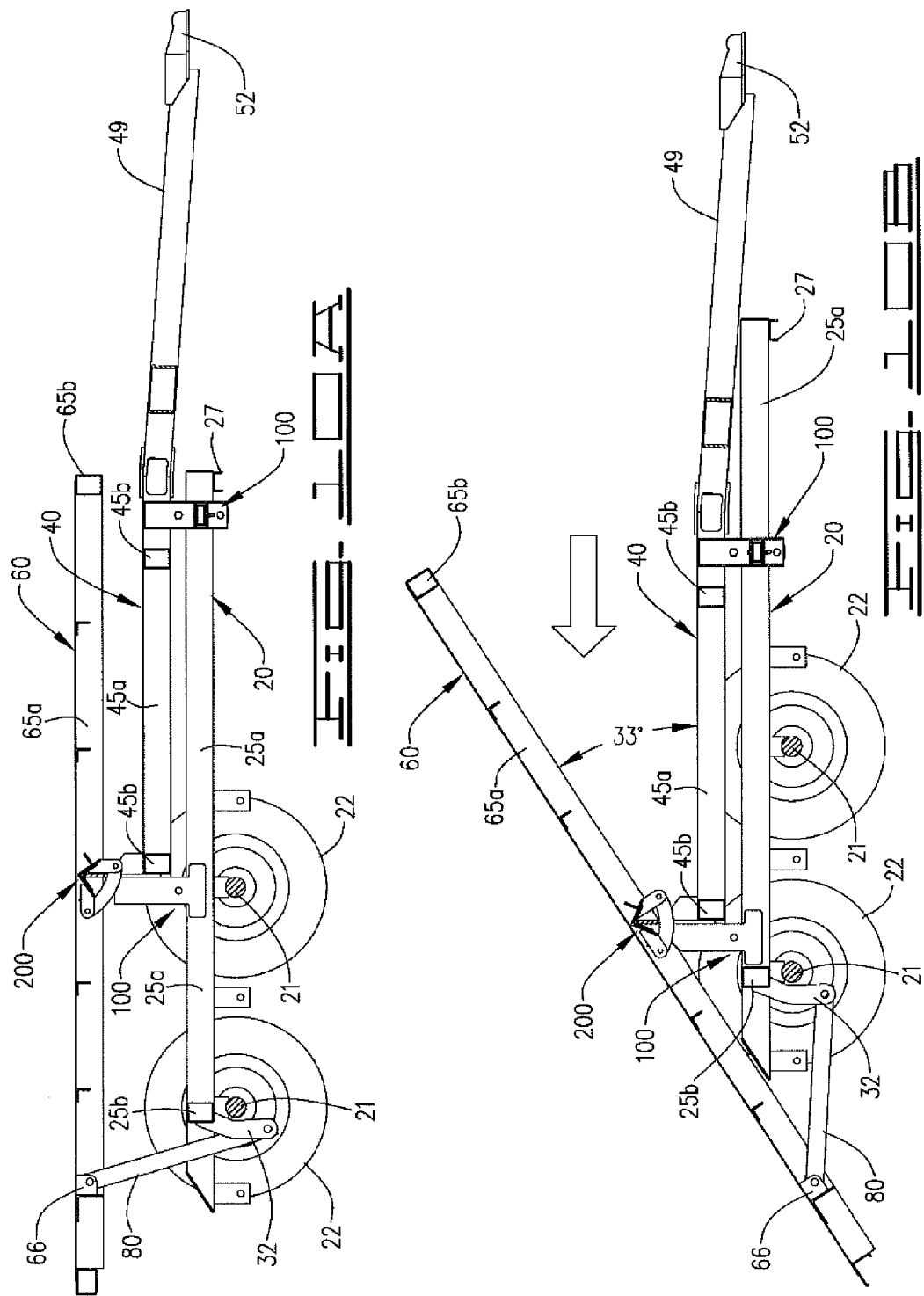

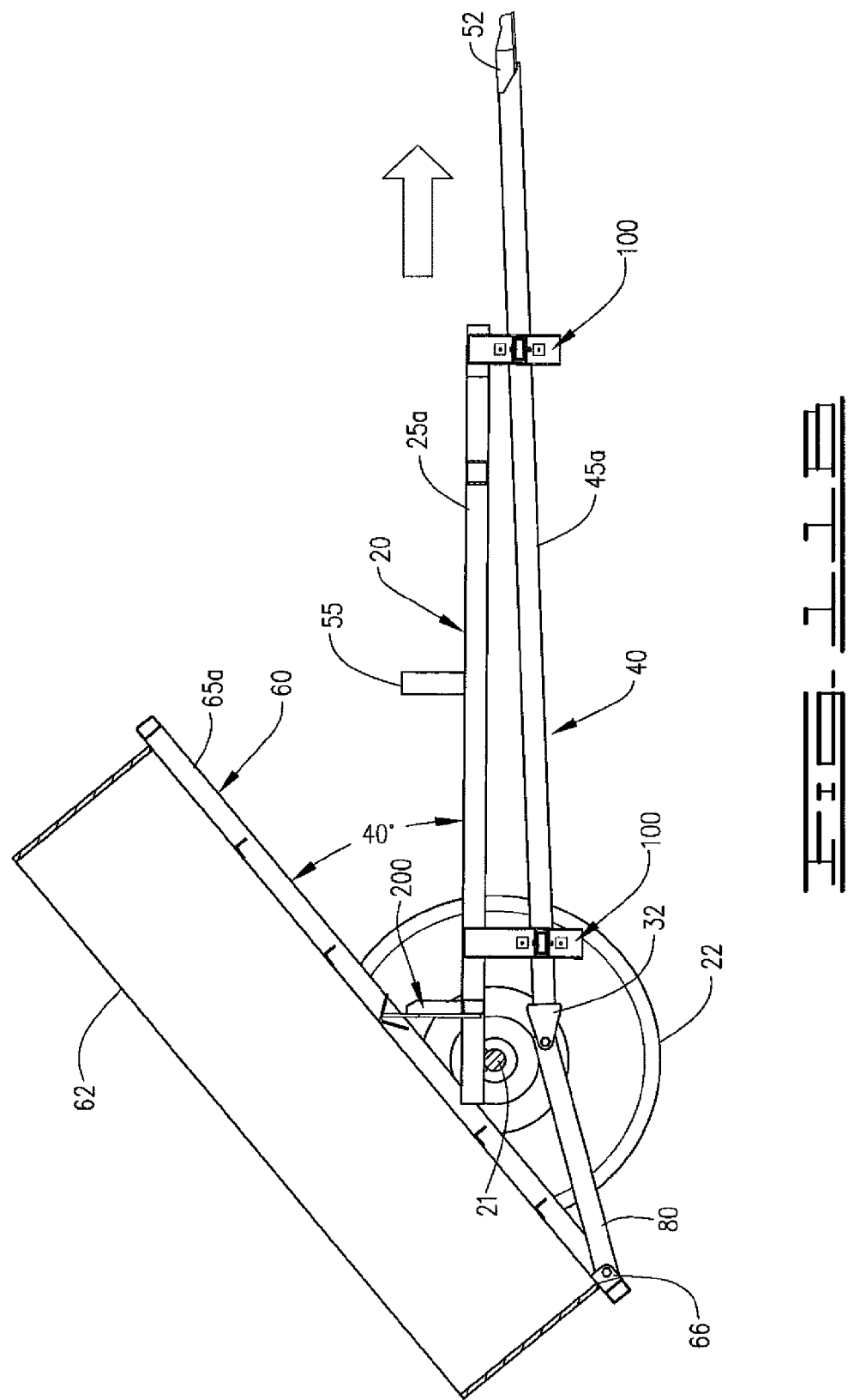

DUMP TRAILER

BACKGROUND

There are a variety of towable dump trailers available on the market. One of the most common designs utilizes hydraulic power to initiate the dump mechanism. Although such designs possess the capacity to handle heavy loads and are easy to operate, the components required to drive a hydraulic power system are quite expensive and are not practical for sporadic individual use or for those that have a tight budget.

Beyond the hydraulic system design, most dump trailers either cannot handle significant loads, cannot be tipped at a controlled rate or require the user to leave the cab of the towing vehicle. As such, what is needed is a dump trailer that has all the advantages of a hydraulic system without the high cost associated with such designs.

SUMMARY

A dump trailer is provided that solves the problems associated with prior designs in that (1) significant loads can be accommodated, (2) the trailer bed can be lowered to the ground slowly and to varying degrees, (3) the dump mechanism can be initiated and completed without the user leaving the towing vehicle cab, (4) it can be constructed for a cost significantly less than that of hydraulic designs and (5) it conserves energy as it does not require a power source to drive the hydraulic system.

The invention described herein is related to a dump trailer that does not require a power system beyond the towing vehicle to perform the dumping mechanism. In one embodiment, the dump trailer comprises a first, second and third frame, each frame comprising one or more support members. In one aspect, the support members are a series of interconnected longitudinal and lateral support beams arranged to form a generally rectangular support frame. The first frame further comprises one or more axles which each provide a set of wheels. The second frame further comprises a towing vehicle attachment site. The third frame provides the support frame for the bed of the trailer and is positioned above the first and second trailers.

In this embodiment, the dump trailer further comprises one or more roller subassemblies positioned between the first and second frames, which permit the second frame to move horizontally forward and backward relative to the first frame. Additionally, the dump trailer further comprises one or more pivot subassemblies, which permit the third frame to pivot as the second frame moves horizontally forward and rearward relative to the first frame. The dump trailer also comprises one or more pivoting arms. The one or more pivoting arms are coupled to a rear portion of the third frame and cause the third frame to pivot about the one or more pivot subassemblies as the second frame moves horizontally backward and forward relative to the first frame.

In one embodiment, the dumping mechanism is performed by immobilizing the first frame and subsequently, backing the towing vehicle toward the stationary first frame. The first frame can be immobilized by a number of different mechanism, but is preferably performed by remotely activating an electric braking mechanism. As the towing vehicle is coupled to the second frame, the backing of the towing vehicle causes the second frame to move horizontally rearward relative to the stationary first frame. This horizontal rearward movement of the second frame causes the pivoting arms to drive or pull the rear portion of the third frame toward the ground and thereby pivot or tilt about the one or more pivot subassemblies. In this embodiment, the second frame is positioned between the first and third frame and the pivoting arms are coupled to the stationary first frame and extend to the third frame. Additionally, the one or more pivot subassemblies include components coupled to both the second and third frames. Thus, in this embodiment, the third frame moves horizontally with the second frame as it pivots to perform the dumping mechanism. The third frame is positioned back to its initial resting position by the towing vehicle pulling the second frame forward.

In another embodiment, the dumping mechanism is performed by immobilizing the first frame and subsequently, driving the towing vehicle forward away from the stationary first frame. In this embodiment, the first frame is alternatively positioned between the second frame and third frame and the pivoting arms interconnect the second and third frames. Furthermore, the one or more pivot subassemblies include components attached to both the first frame and third frames. Thus, in this embodiment, the third frame is horizontally stationary and simply pivots relative to the one or more pivot subassemblies as the second frame moves horizontally relative to the immobilized first frame.

The first frame can be immobilized by any number of mechanisms, but is preferably performed by activating an electric braking mechanism from the cab of the towing vehicle, thus causing the wheels of the first frame to become stationary. The roller subassemblies, pivot subassemblies and pivoting arms can take a variety of different forms beyond those described herein as long as each performs its intended function. Furthermore, the dump trailer can be arranged in a variety of configurations without departing from the inventive concept described in the following exemplary and preferred embodiments.

BRIEF DESCRIPTION OF THE DRAWINGS

FIG. 2A is a side view of one embodiment of the dump trailer in a tow position.

FIG. 4A is a perspective view of one embodiment of the second frame.

FIG. 4B is a perspective view of a second embodiment of the second frame.

FIG. 5A is a perspective view of one embodiment of the third frame.

FIG. 5B is a perspective view of a second embodiment of the third frames.

FIG. 6A is a front, cross-sectional view of one embodiment of a roller subassembly.

FIG. 6B is a perspective view of a second embodiment of a roller subassembly.

FIG. 6C is a front cross-sectional view of the roller subassembly embodiment of FIG. 6B.

FIG. 7A is a side view of one embodiment of a pivot subassembly.

FIG. 7B is a front cross-sectional view of the pivot subassembly depicted in FIG. 7A.

FIG. 8A is a side cross-sectional view of a second embodiment of a pivot subassembly.

FIG. 9A is a side cross-sectional view of the rear portion of the trailer depicting one embodiment of a pivoting arm.

FIG. 9B is a close-up perspective view of the upper mounting bracket for one embodiment of the pivoting arm.

FIG. 10A is a side cross-sectional view of a second embodiment of the dump trailer in a tow position.

FIG. 10B is a side cross-sectional view of the embodiment of FIG. 10A in a dump position.

FIG. 11B is a cross-sectional side view of the embodiment of FIG. 9A in a dump position.

DETAILED DESCRIPTION OF THE PREFERRED EMBODIMENTS

The current invention is directed to a dump trailer that does not require a hydraulic or other power system. The inventive dump trailer design provides an efficient and controlled dumping action that can handle payloads comparable to hydraulic dump trailers without the expense and maintenance issues associated with such trailers. The dump trailer generally comprises three frames that are either horizontally or pivotally movable with respect to each other. The dump trailer operates by immobilizing one of the trailer frames and either backing the tow vehicle toward the immobilized trailer frame or moving the tow vehicle forward away from the immobilized frame. The forward or rearward displacement of one or more of the frames with respect to the immobilized frame initiates a pivoting mechanism thereby causing a trailer bed frame to tilt.

Although a variety of non-hydraulic dump trailers have been described previously, the current dump trailer provides a significant departure from these previous designs and yields a dump trailer with a superior load capacity and improved dumping control. The advantages and improvements of the inventive dump trailer will become more apparent as the embodiments are described in more detail below.

Figure 1B:
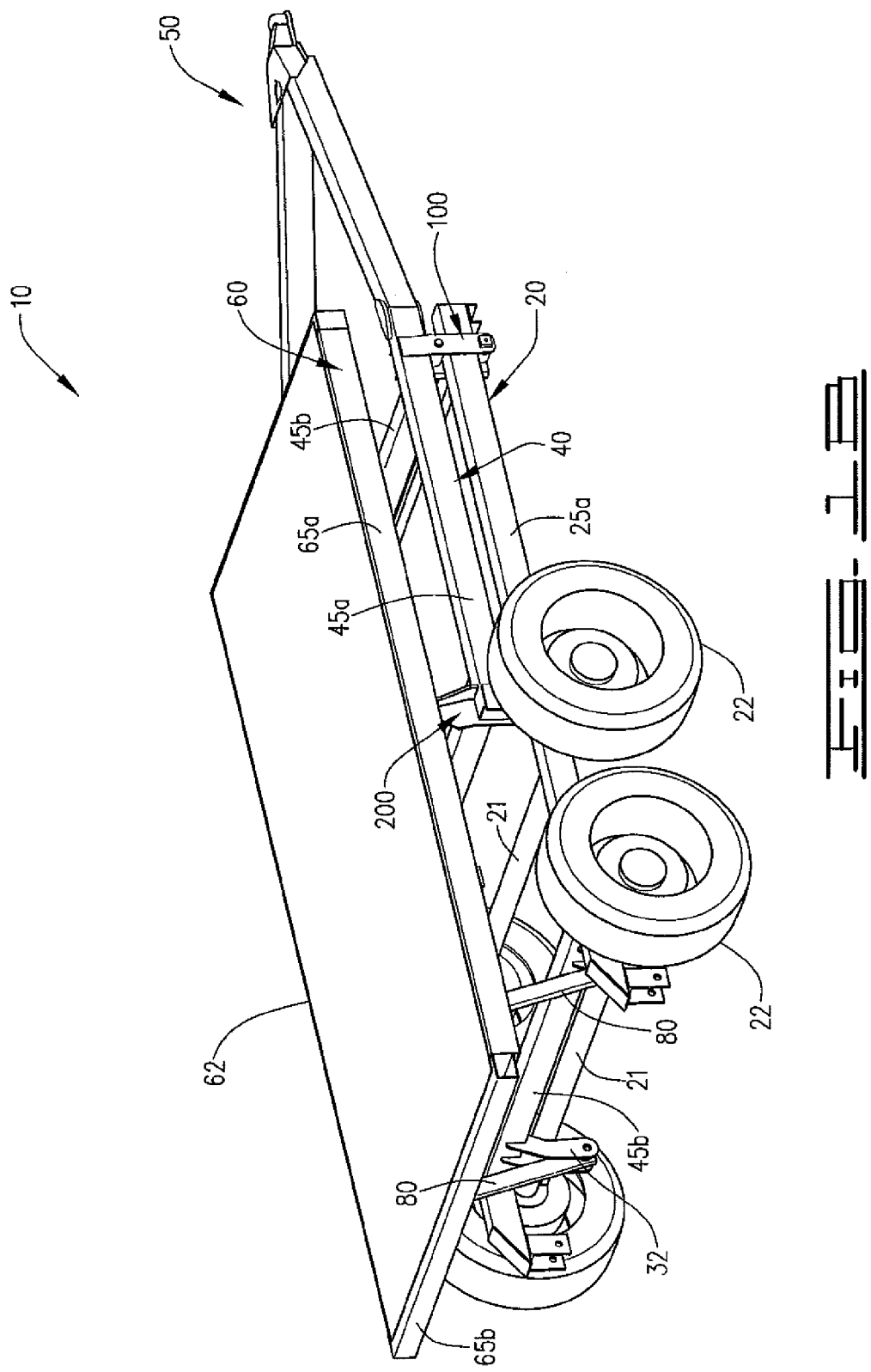
FIG. 1B is a perspective view of a second embodiment of the inventive dump trailer.
Figure 1:
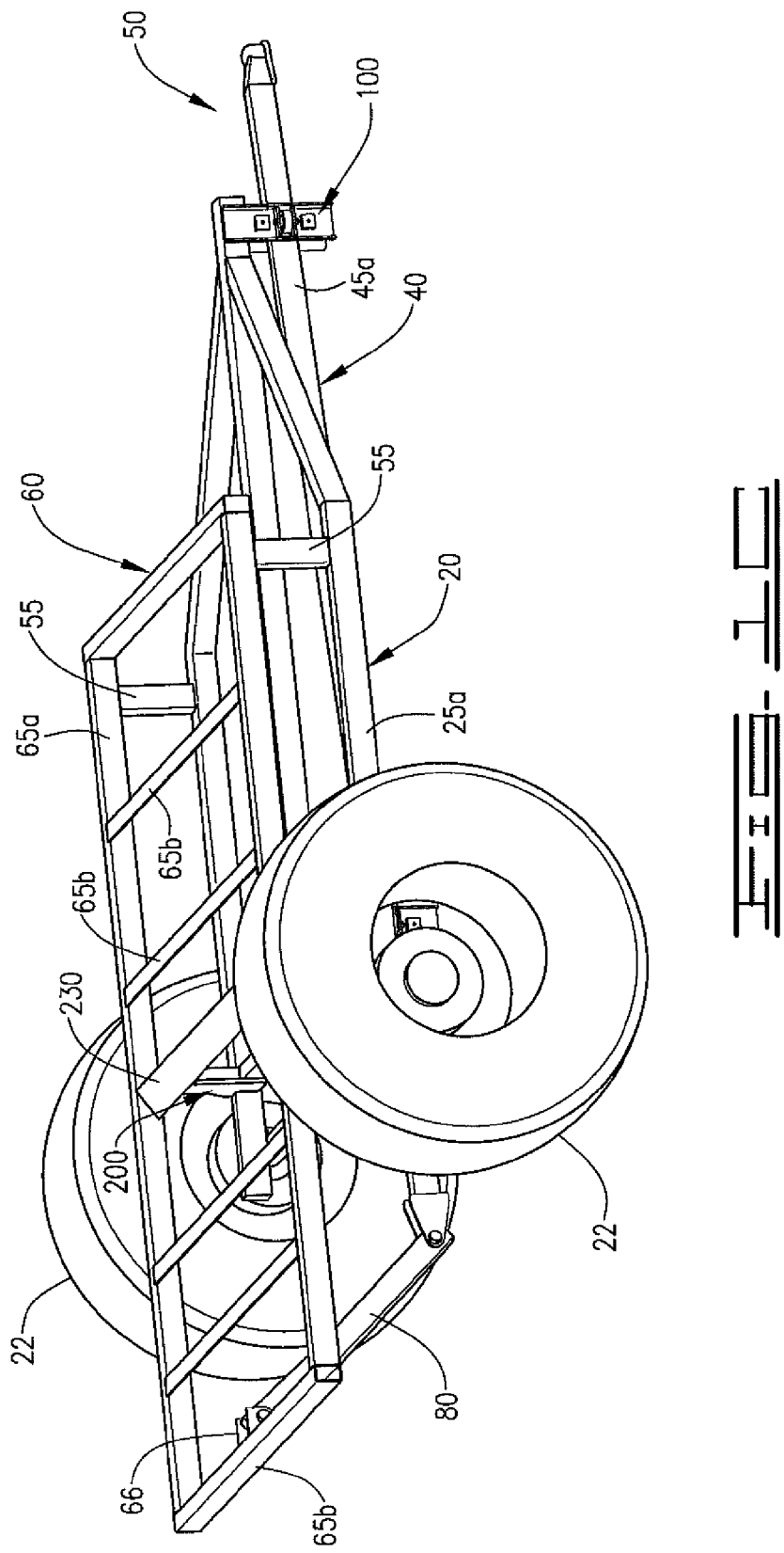
FIG. 1A is a perspective view of a first embodiment of the inventive dump trailer.
FIG. 1C is a perspective view of a third embodiment of the inventive dump trailer.
Figure 2B:
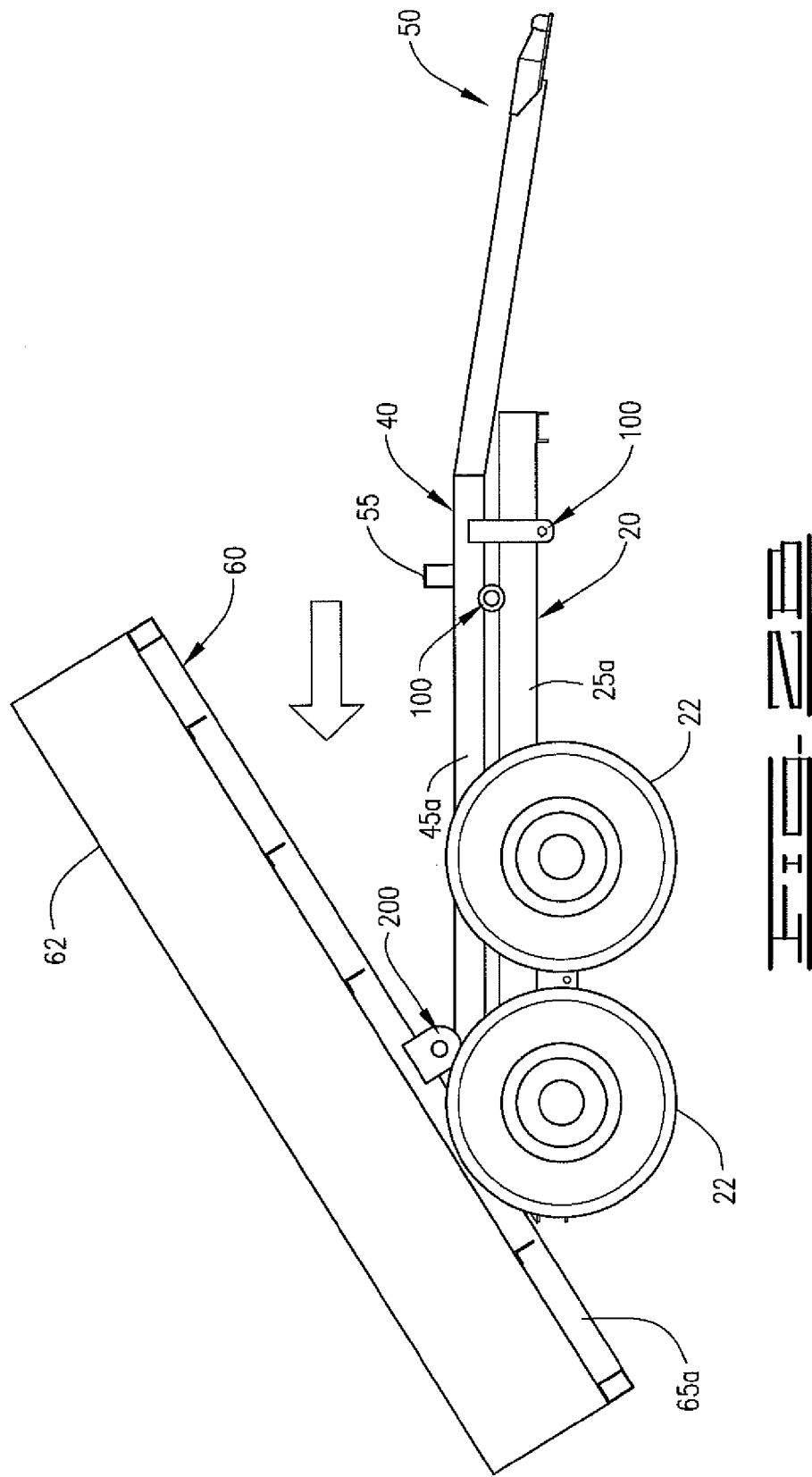
FIG. 2B is a side view of the embodiment of FIG. 2A in a dump position.

FIGS. 1A-C provide three alternative embodiments of the inventive dump trailer 10. FIGS. 1A and B are directed to embodiments wherein the tow vehicle reverses toward the stationary first frame of the dump trailer to perform the dumping action (hereinafter referred to as the "reverse-dump configuration"). Alternatively, FIG. 1C is directed to an embodiment wherein the tow vehicle pulls forward away from the stationary first frame to perform the dumping action (hereinafter referred to as the "forward-dump configuration"). Regardless of the particular embodiment, dump trailer 10 generally comprises a first frame 20, a second frame 40 and a third frame 60. First frame 20, second frame 40 and third frame 60 are each comprised of one or more support members 25, 45, 65, respectively. The one or more support members 25, 45, 65 can consist of one or more longitudinal support beams 25a, 45a, 65a and one or more lateral support beams 25b, 45b, 65b. First frame 20 further comprises one or more axles 21 supporting one or more sets of wheels 22. Second frame 40 further comprises a towing vehicle attachment site 50 and one or more resting posts 55. Third frame 60 generally forms the support structure for the base of the trailer bed 62.

Dump trailer 10 further comprises one or more roller subassemblies 100 positioned between one or more support members 25, 45 of first frame 20 and second frame 40, respectively. Roller subassemblies 100 permit the second frame 40 to move horizontally forward and backward relative to first frame 20. Additionally, dump trailer 10 further comprises one or more pivot subassemblies 200. Pivot subassembly 200 permits third frame 60 to pivot or tilt as second frame 40 moves horizontally forward and rearward relative to first frame 20. Dump trailer 10 further comprises one or more pivoting arms 80. Pivoting arms 80 are coupled to a rear portion of third frame 60 and cause third frame 60 to pivot about one or more pivot subassemblies 200 as second frame 40 moves horizontally backward and forward relative to first frame 20.

As depicted in FIGS. 2A-B and 10A-B, the dumping mechanism can be performed by immobilizing the first frame 20 and subsequently, backing the towing vehicle (not depicted) toward the stationary first frame 20. This action causes the second frame 40, which is coupled to the towing vehicle, to move horizontally rearward relative to the stationary first frame 20. This horizontal rearward movement of second frame 40 causes the pivoting arms 80 to drive or pull the rear portion of third frame 60 toward the ground and thereby pivot or tilt third frame 60 about one or more pivot subassemblies 200. In these embodiments, second frame 40 is positioned between first frame 20 and third frame 60, and pivoting arms 80 are coupled to a rear lateral support beam 25b of the stationary first frame 20 and extend to a rear lateral support 65b of third frame 60.

In another embodiment depicted in FIGS. 11A-B, the dumping action is performed by immobilizing first frame 20 and subsequently, driving the towing vehicle forward away from stationary first frame 20. In this embodiment, the first frame 20 is alternatively positioned between the second frame 40 and third frame 60, and the pivoting arms 80 interconnect second frame 40 and third frame 60. Furthermore, the one or more pivot subassemblies 200 include components attached to first frame 20 and third frame 60. Thus, in this embodiment, third frame 60 is horizontally stationary and pivots relative to one or more pivot subassemblies 200 as second frame 20 moves horizontally relative to the immobilized first frame 20.

Figure 3A:
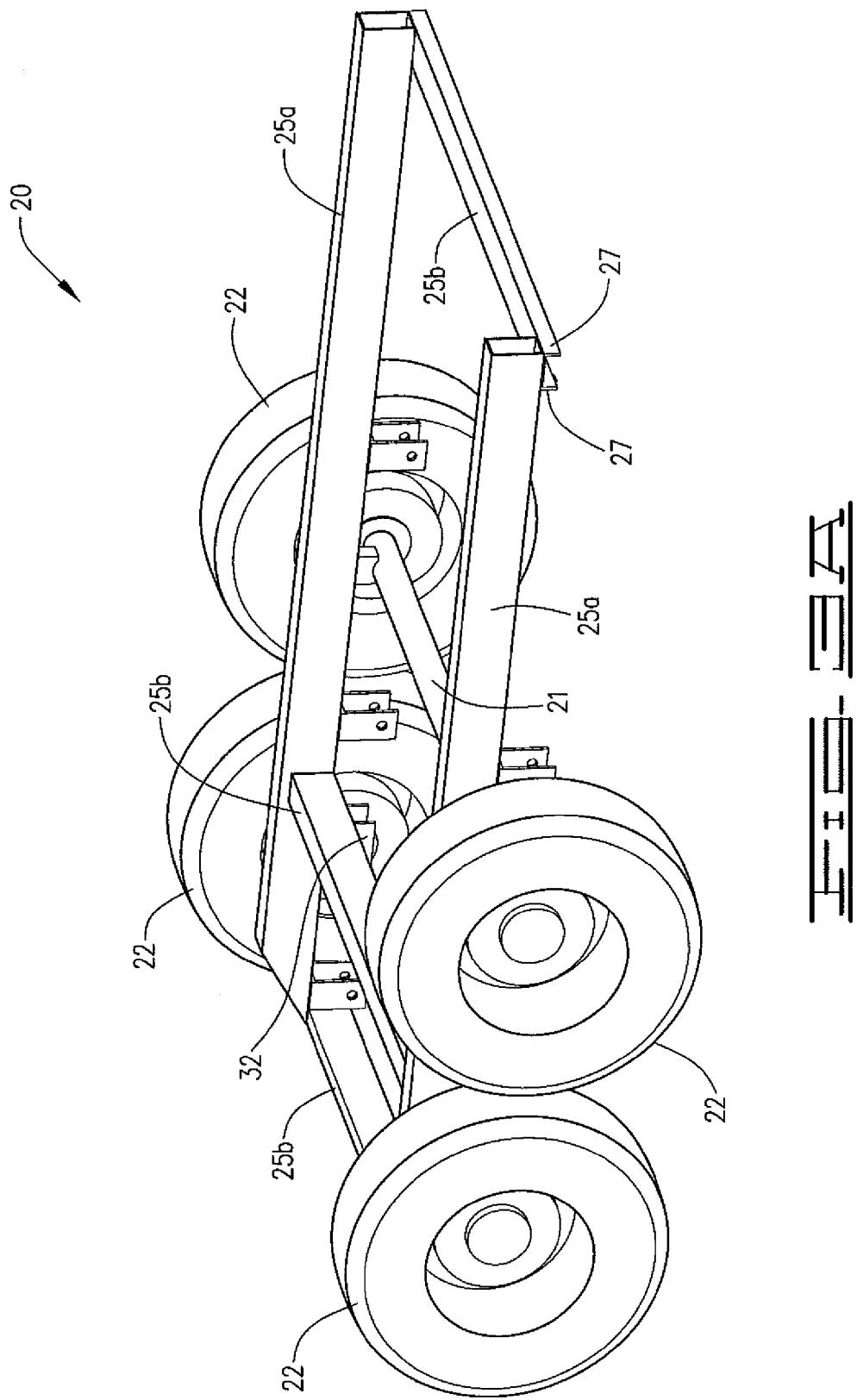
FIG. 3A is a perspective view of one embodiment of the first frame.

One embodiment of first frame 20 is depicted in FIG. 3A. Here, first frame 20 comprises a pair of parallel longitudinal support beams 25a and a plurality of lateral support beams 25b that traverse the longitudinal support beams 25a. The front or forward lateral support 25b is attached to the underside of the longitudinal support beams 25a and includes flange 27 which extends toward the ground. Flange 27 provides a surface to limit forward motion of the second frame 40 relative to the first frame 20. First frame 20 further comprises one or more lower mounting brackets 32 attached to a rear lateral support 25b for providing an attachment site for pivoting arms 80. The details of lower mounting bracket 32 are described in more detail below.

First frame 20 further comprises one or more axles 21 each supplying a pair of wheels 22 suitable for permitting transport of trailer 10 and also providing a means to immobilize first frame 20 to perform the dumping action. Axles 21 can be positioned at any point along the length of longitudinal support beams 25a. However, in a preferred embodiment, axles 21 and wheels 22 are positioned in the rear half of first frame 20.

Figure 3B:
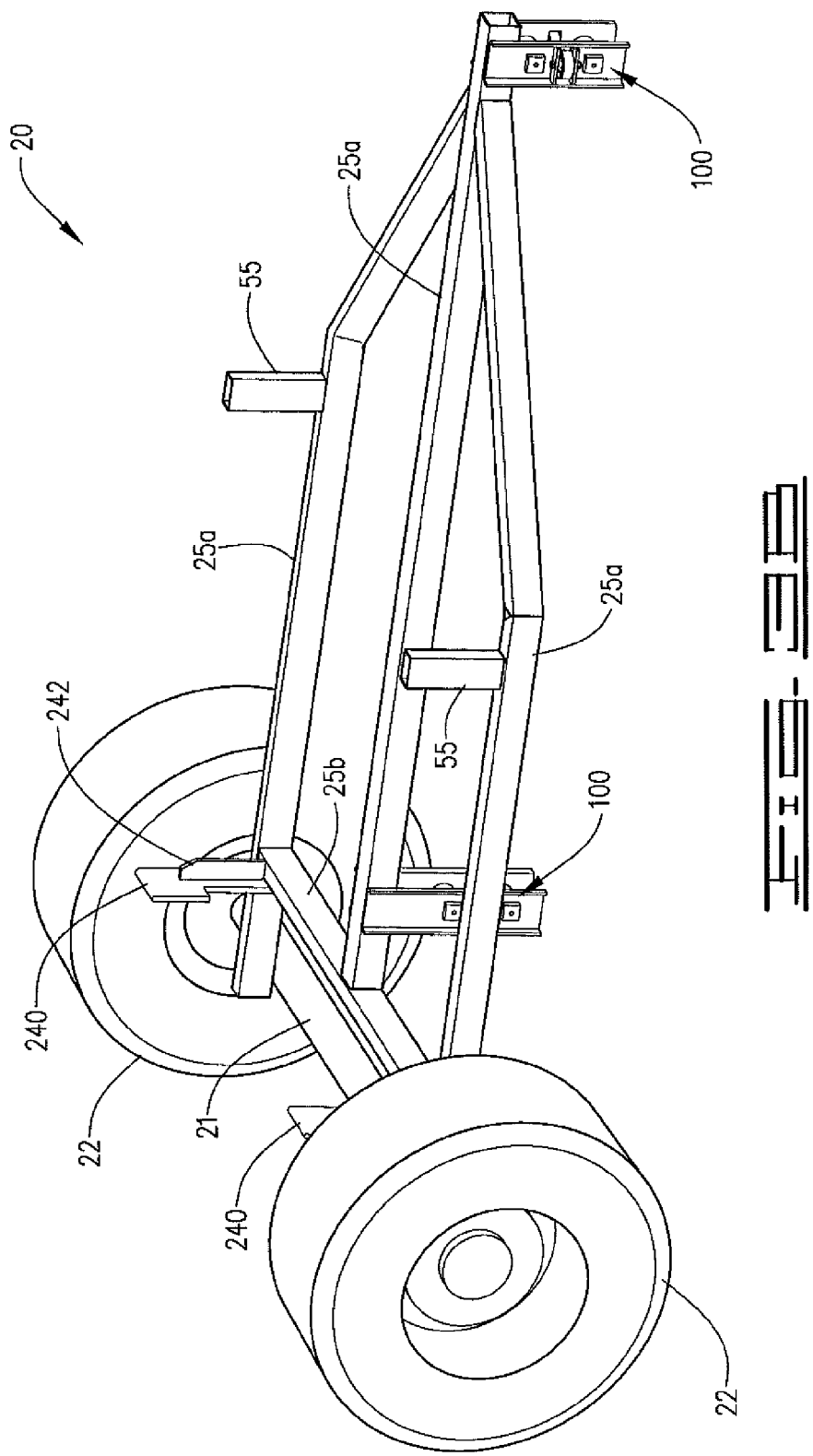
FIG. 3B is a perspective view of a second embodiment of the first frame.

FIG. 3B depicts an embodiment of first frame 20 suitable for a forward-dump configuration. The modifications to first frame 20 in this embodiment are a result of the preferred arrangement of the frames for a forward-dump configuration. To this end, first frame 20 is positioned between second frame 40 and third frame 60 as depicted in FIG. 1C. As first frame 20 is adjacent to third frame 60, portions of the pivot subassembly 200, namely rocker plate 240 and support plate 242 are associated with first frame 20 rather than second frame 40 in the reverse-dump configuration. Similarly, first frame 20 comprises resting posts 55 for supporting third frame 60 in the tow position. In addition, first frame 20 provides an attachment site for one or more roller subassemblies 100 (described in detail below).

In either embodiment, dump trailer 10 comprises a braking mechanism (not shown) independent of the towing vehicle brake system. The brake system permits immobilization of first frame 20 by locking wheels thereby allowing the tow vehicle to move second frame 40 rearward and forward relative to the stationary first frame 20. Preferably, the braking mechanism can be performed without leaving the cab of the towing vehicle. In one embodiment, the braking mechanism comprises a receiver electrically coupled to one or more of the brakes. The receiver has the capacity to receive signals via a remote located in the cab of the towing vehicle. In response to a remote signal, the receiver sends an electrical current sufficient to engage the brakes. A suitable receiver has a 12 V DC input and output with a 6 Amp maximum output current with sufficient wiring to draw on a power supply and to apply a electrical current to engage the brakes. The remote is preferably battery powered and provides controls for engaging and releasing the brakes. The brakes can comprise any trailer brake having the capacity to receive an electrical signal and must have sufficient breaking capacity to prevent movement of first frame 20 during the dumping process. However, an electric braking mechanism is not absolutely necessary. In another embodiment, wheels 22 can be simply blocked on either side by structure suitable to prevent movement of the first frame 20 as the towing vehicle displaces second frame 40.

FIG. 4A provides one embodiment of the second frame 40. In the reverse-dumping configuration, second frame 40 is disposed between the first frame 20 and third frame 40 and provides the portion of trailer 10 that is coupled to the towing vehicle to actuate the dumping action. Second frame 40 comprises two longitudinally extending support beams 45a as well as two lateral support beams 45b. In this embodiment, second frame 40 includes towing vehicle coupling portions 48 such as angled tongues 49 extending from each end of the longitudinal support beams 45a. Alternatively, the towing vehicle coupling portion 48 can comprise a single tongue portion which extends from a front end lateral support 45. In either case, tongues 49 should be of a length to provide sufficient displacement of second frame 40 without contacting first frame 20 as the towing vehicle backs up. Second frame 40 further comprises a towing vehicle attachment site 50. Attachment site 50 can include any suitable attachment means 52 that permits attachment of the trailer 10 to the towing vehicle. In one embodiment, attachment means 52 is a standard trailer hitch.

The second frame 40 further comprises one or more third frame resting posts 55. Resting posts 55 can be placed anywhere on the front portion of second frame and preferably extend from the longitudinal support beams 45a. Resting posts 55 should be of a height sufficient to allow the third frame 60 to rest at an orientation parallel to the first frame 20 and second frame 40 when in the resting position.

FIG. 4B depicts an embodiment of second frame 40 for use in the forward-dumping configuration. In this embodiment, second frame 40 comprises a single longitudinal support beam 45a with attachment means 52 and lower mounting bracket 32. Thus, pivoting arm 80 is attached to second frame 40 in one this embodiment of a forward-dumping configuration.

FIGS. 5A-B depict alternative embodiments of third frame 60. Third frame 60 provides the base for trailer bed 62. Third frame 60 generally comprises two longitudinal support beams 65a which are traversed by a series of lateral support beams 65b. Additionally, third frame 60 comprises one or more upper mounting brackets 66 for attachment of the pivoting arms 80.

Third frame 60 also provides attachment sites for components of pivot subassembly 200. As depicted in FIG. 5A, longitudinal support beams 65a have attached thereto flanges 212 which supply inner pipe 210 in one embodiment of pivot subassembly 200 described below. Another embodiment of pivot subassembly 200 comprises angle iron 230 which is disposed between longitudinal support beams 65a of third frame 60 as shown in FIG. 5B.

Third frame 60 can support a variety of trailer beds 62. In one embodiment, trailer bed 62 can comprise front, rear and side walls as depicted in FIG. 1A. Alternatively, trailer bed 62 can be constructed as a flat bed as shown in FIG. 1B.

Dump trailer 10 comprises one or more roller subassemblies 100. Roller subassemblies 100 are preferably disposed between longitudinal beams 25a, 45a and permit forward and rearward horizontal movement of the second frame 40 relative to the first frame 20. As depicted in FIG. 6A, one embodiment of roller subassembly 100 comprises a cylindrical member 110 that extends at least the width of longitudinal support beams 25a, 45a. The cylindrical member 110 is attached on each end by two outer flanges 112. Outer flanges 112 are of a sufficient length to overlap the adjacent longitudinal support beams 25a and 45a of the first frame 20 and second frame 40, respectively, and secure the rollers 110 between the longitudinal support beams 25a, 45a.

Rollers 110 should be of a hardness that reduces tangential friction as second frame 40 moves forward and rearward horizontally along first frame 20. Finally, the material of the roller 61 must be strong enough to resist damage from foreign debris that may land upon the top side of beams 24. In one aspect, rollers 110 are a solid 2" steel cylinder. In a preferred embodiment, there are a total of four roller subassemblies 100 between the first frame 20 and second frame 40. However, depending on the particular design of the trailer, such as that depicted in FIG. 1C, two roller subassemblies may be sufficient.

FIGS. 6B and C depict an alternative embodiment of roller subassembly 100. In this embodiment, roller subassembly 100 includes a top roller 114, a bottom roller 116 and two side rollers 118. The top and bottom rollers 114, 116 are secured between plates 122 via a pin 124. Side rollers 118 are positioned in an opening 126 in plates 122 located between the top and bottom roller attachment sites. A flange 128 is located on the top and bottom side of opening 126 which permits attachment of side rollers 118 to plate 122. In a reverse-dumping arrangement as depicted in FIG. 1C, the series of rollers 114, 116, 118 surround a longitudinal support beam 25a of first frame 20 and plates 122 are fixed to a longitudinal support beam 45a of second frame 40. Alternatively, in a forward-dumping arrangement as depicted in FIGS. 10A and 10B, rollers 114, 116, 118 surround longitudinal support beam 45a of second frame 40 and plates 122 are fixed to a longitudinal support beam 25a of first frame 20.

Although the term "roller subassembly" can include roller-type structures as described herein, the term should generally be understood to denote any group of parts that permit horizontal linear movement between two surfaces, namely the longitudinal support beams of the first and second frames 20, 40. As such, a "roller subassembly" does not necessarily require a roller-type structure. For example, a thick piece of nylon or other rigid polymer can be placed between beam 45*a* of second frame 40 and beam 25*a* of first frame 20 to permit a horizontal movement between the frames. The thick plate of polymer provides a low friction interface between first and second frames. Although this option may be suitable in most trailer designs, the use of roller-type structures offers an interface between the first frame 20 and second frame 40 that is even lower in friction by utilizing rolling friction as opposed to sliding friction. The reduction of frictional forces associated with the translation of second frame 40 relative to first frame 20 reduces the overall magnitude of the forces required to articulate third frame 60 into both its dumping and towing positions.

Dump trailer 10 further comprises one or more pivot subassemblies 200 which permit pivotal movement of third frame 60 in response to the horizontal displacement of second frame 40. In one embodiment as shown in FIGS. 7A and B, pivot subassembly 200 comprises an inner pipe 210 attached on either side by flanges 212 which extend down from longitudinal support beam 65*a* of third frame 60 and an outer pipe 220 attached to vertical post 222 extending from the longitudinal support beam 45*a*. Inner pipe 210 is of an outer diameter sufficient to fit within the inner diameter of outer pipe 220. In this embodiment, inner pipe 210 is able to rotate within outer pipe 220 thereby permitting pivotal movement of third frame 60 about pivot subassembly 200. In a related embodiment, inner pipe 210 is not permanently attached to the flanges 212 of the third frame 60 such that it could be replaced if damage was to occur. In this embodiment, the inner pipe 210 comprises an opening for a pin or other device to secure its lateral positioning.

Figure 8C:
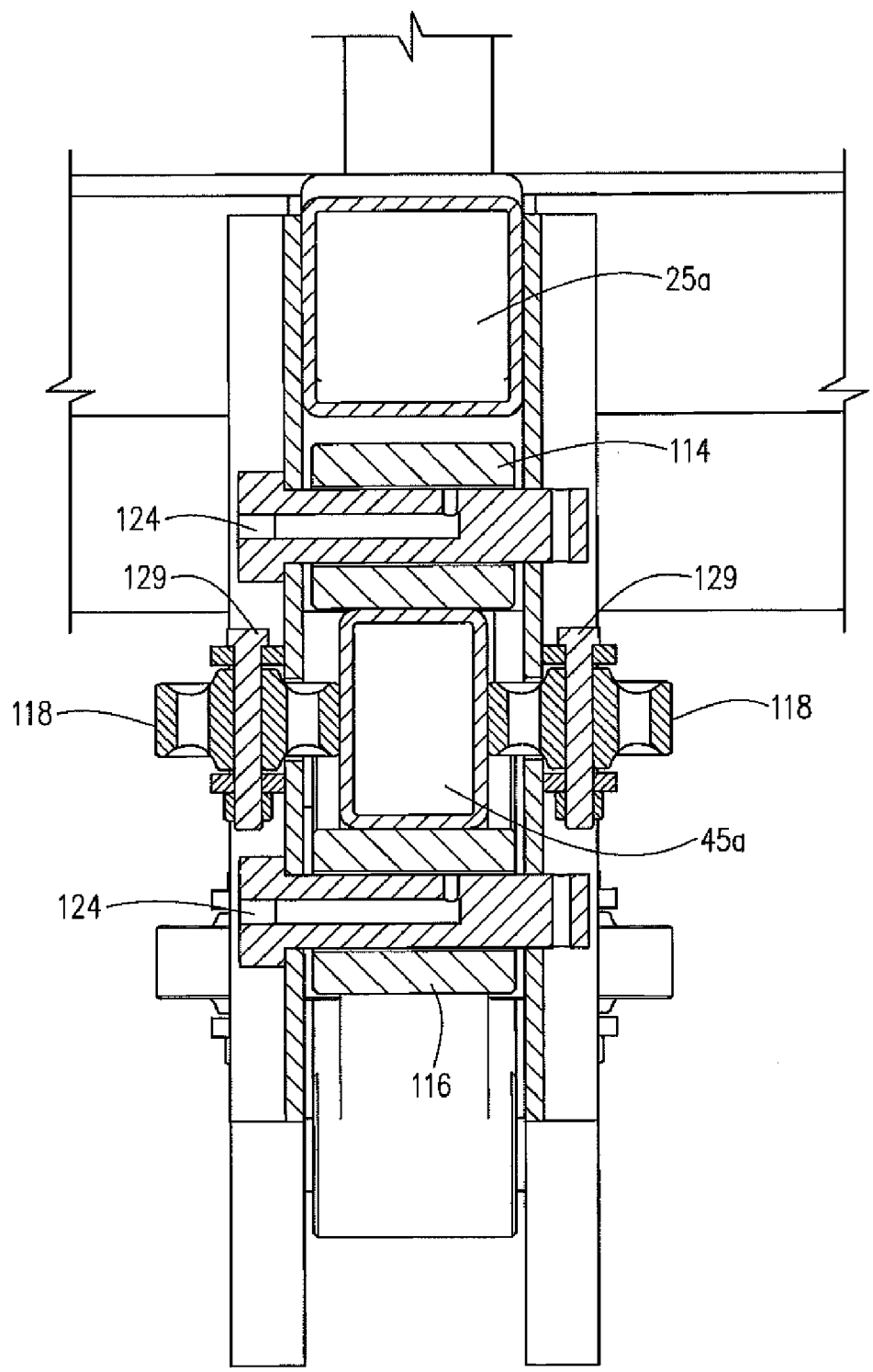
FIG. 8C is an exploded perspective view of the roller subassembly depicted in FIG. 8A.
Figure 8B:
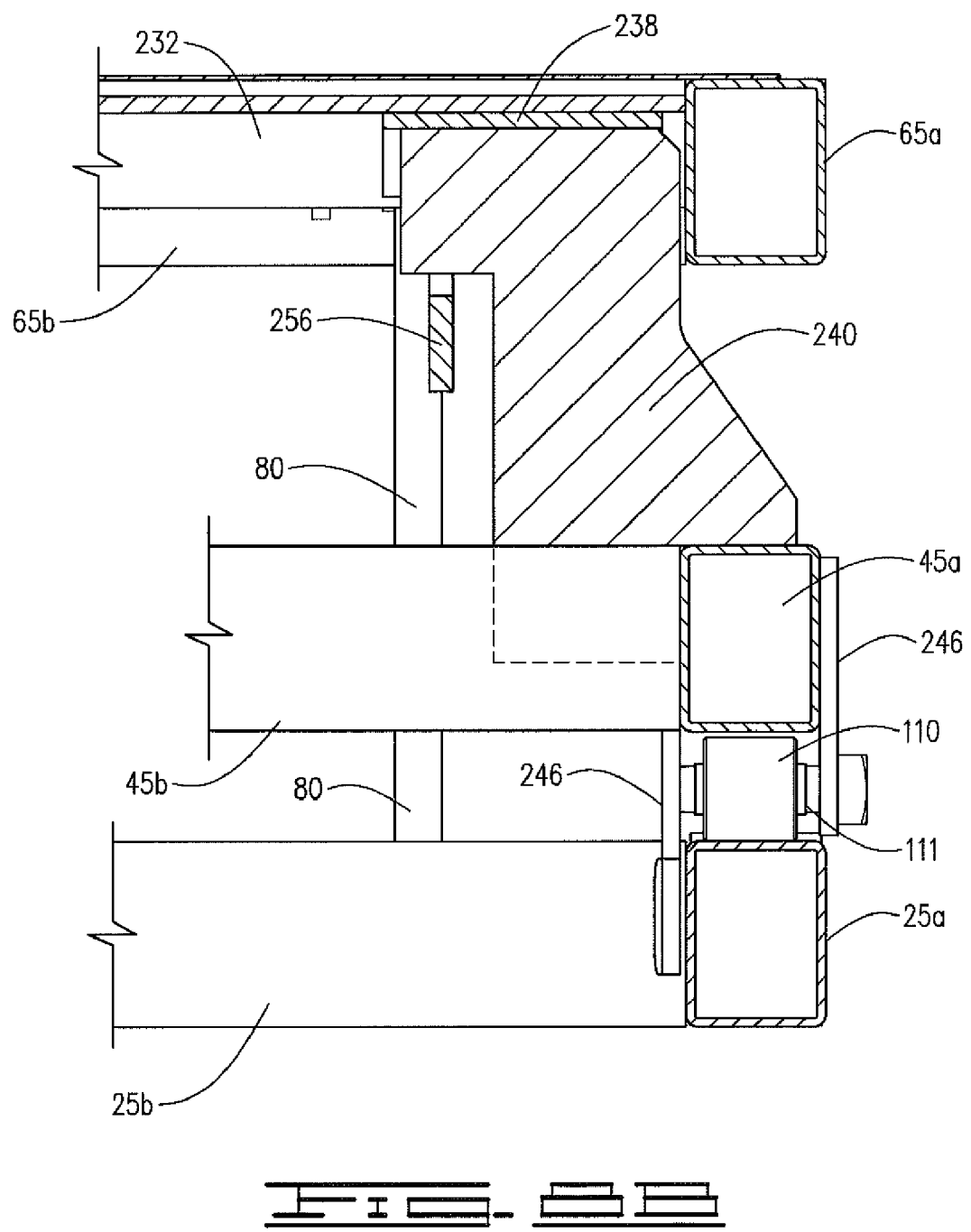
FIG. 8B is a front cross-sectional view of the pivotal point subassembly depicted in FIG. 8A.
Figure 3A:
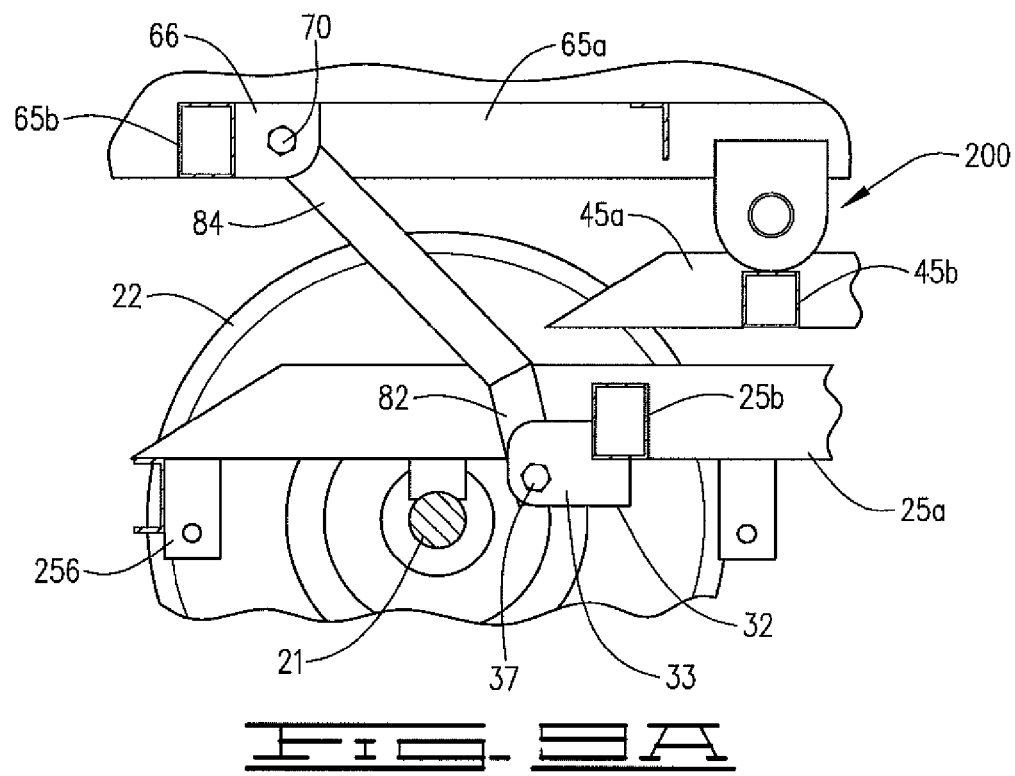
Figure 3B:
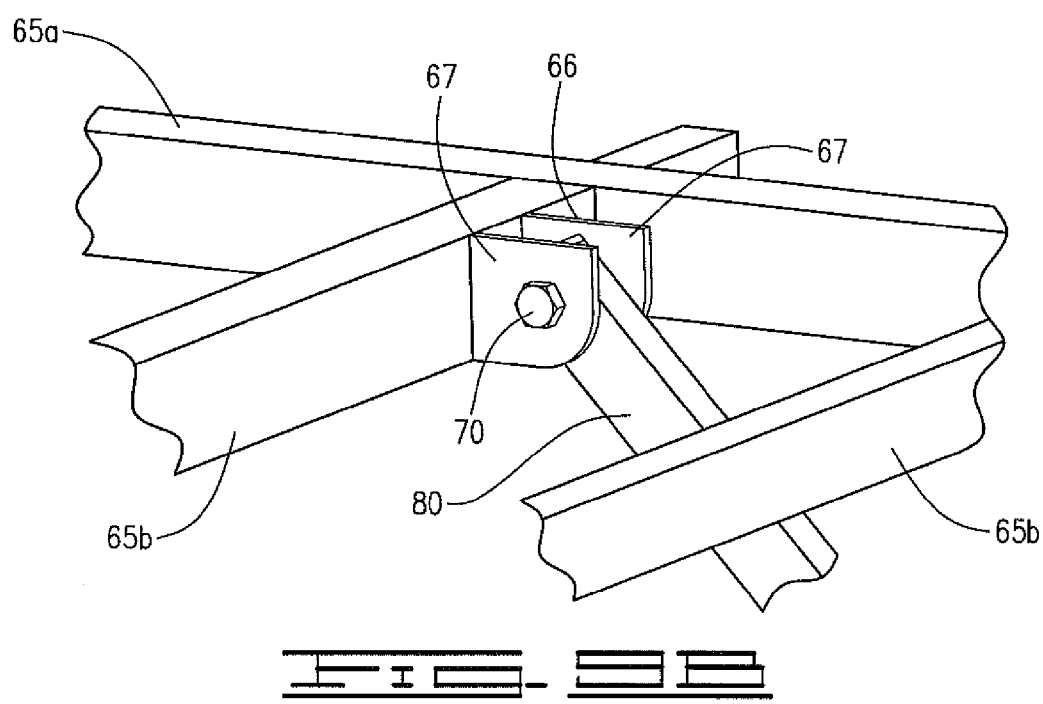

Another embodiment of pivot subassembly 200 is depicted in FIGS. 8A and 8B. In this embodiment, pivot subassembly 200 comprises an angle iron 230 disposed between longitudinal support beams 65*a* of third frame 60 and a vertical rocker plate 240 extending from a lower frame member. In one embodiment, rocker plate 240 is welded to the back surface of lateral support beam 45*b* and additionally includes an extended portion attached to longitudinal support beam 45*a*. Alternatively, rocker plate 240 can be attached to the front or forward surface of lateral support beam 45*b*. In a preferred embodiment, pivot subassembly 200 further comprises perpendicular support plates 242, 244. Support plate 244 is attached to the rear surface of rocker plate 240 and is coupled to longitudinal support beam 45*a* and lateral support beam 45*b*. Support plate 242 is coupled to the forward surface of rocker plate 240 and extends from lateral support beam 45*b*. Alternatively, support plate 242 can be angled such that it contacts both lateral and longitudinal support beams 45*b* and 45*a*, respectively. However, any number or arrangement of support plates can be utilized.

Angle iron 230 includes two planar surfaces 232, 234 which are joined at a 90 degree angle to form an inverted v-shape. Angle iron 230 extends between longitudinal support beams 65*a* and is positioned on third frame 60 such that one or more rocker plates 240 intersect apex 236 of angle iron 230. The intersection of rocker plate 240 and angle iron 230 forms the point about which third frame 60 pivots during the dumping mechanism.

Angle iron 230 can be secured to third frame 60 at a variety of different rotational angles depending on the amount of tilt required by third frame 60 to obtain the full dump position. This is largely a function of the distance from apex 236 to the ground. A greater distance will require a greater angle X, the angle between rocker plate 240 and trailing surface 232 of angle iron 230. This angle X is to permit sufficient tilt in third frame 60 to contact or nearly contact the ground. In a preferred embodiment, angle X is approximately 60 degrees.

In one aspect, a hardened metal wear plate 238 is welded to angle iron 230 to provide a contact surface for rocker plate 240. In this instance, rocker plate 240 is preferably made of a softer-grade steel than wear plate 234 which can aid in reducing the wear to rocker plate 240 caused by the pivotal movement of third frame 60. In a preferred embodiment, angle iron 230 is made of steel having 120K tensile strength.

Additionally, a retainer bracket 250 can be employed to prevent lateral movement of third frame 60 on rocker plate 240. As depicted in FIG. 8A, retainer bracket 250 includes a pair of attachment tabs 252, 254 and a clip 256 extending between tabs 252 and 254.

As depicted in FIG. 8C, the parts of pivot subassembly 200 can simultaneously be used in a roller subassembly 100. For example, support plate 244 can form the attachment plate for roller 110. In this embodiment, roller 110 includes a central pin structure 111 that extends beyond each end of roller 110 and attaches to support plate 244 and plate 246 which is attached to longitudinal support beam 45*a*.

FIG. 9A depicts one embodiment of pivoting arms 80. Pivoting arms 80 act to direct the rear portion of third frame 60 to the ground as the second frame moves horizontally relative to the stationary first frame 20 thereby causing third frame 60 to tilt or pivot relative to pivot subassembly 200. In the reverse-dumping configuration depicted in FIG. 9A, pivoting arms 80 extend from the stationary first frame 20 to third frame 60. Alternatively, in the forward-dumping configuration, pivoting arms 80 extend from the second frame 40 to third frame 60 as depicted in FIG. 11A. In the reverse dumping configuration, pivoting arms 80 are each coupled to first frame 20 via a lower mounting bracket 32 attached to lateral support beam 25*b*. Lower mounting bracket 32 comprises a pair of mounting plates 33 and 34 extending from lateral support 25*b* sufficient to house one end of pivoting arm 80. Pivoting arm 80 is secured between mounting plates 33, 34 by a pin or bolt 37 extending through plate openings 35, 36, wherein the pin or bolt 37 permits pivotal movement of pivoting arm 80. Each pivoting arm 80 extends from lower mounting bracket 32 on first frame 20 to a similar upper mounting bracket 66 on third frame 60. As demonstrated in FIG. 9B, upper mounting bracket 66 comprises two flanges 67 extending from lateral support 65*b*. Pivoting arms 80 are secured between flanges 67 by a pin or bolt 70 that extend through openings 69. The pin or bolt 70 should permit pivotal movement of the pivoting arm 80 relative to the bracket 66.

As depicted in FIG. 9A, one embodiment of pivoting arm 80 comprises a first arm portion 82 and a second arm portion 84. The first arm portion 82 is pivotally attached to the mounting bracket 32 of the first frame 20 whereas the second arm portion 84 is pivotally attached to mounting bracket 67 located on the third frame 60. In one embodiment, first arm portion 82 and second arm portion 40 are angled with respect to each other to provide clearance from rear axle 21 when third frame 60 is in the dumping position. Furthermore, the lengths of arm portions 82, 84 and the angle between arm portions 82, 84 can be adjusted as needed based on the particular arrangement adopted. In a separate embodiment depicted in FIG. 10A, arms 80 may comprise only a single, straight portion. The embodiments of pivoting arm 80 described above are not meant to limit the scope of the invention. The pivoting arm 80 can be modified from these embodiments to fit a variety of different trailer dimensions and special needs so long as the pivoting arms 80 perform the intended function.

FIGS. 10A and 10B provide a preferred embodiment of the reverse-dumping configuration. FIG. 10A depicts dump trailer 10 in the starting or tow position. To begin the dumping action, the driver or passenger of tow vehicle immobilizes first frame 20 by initiating a brake mechanism to trailer wheels 22. Once the brake is set and the first frame 20 is immobilized, the driver backs the tow vehicle toward the stationary first frame 20 causing horizontal displacement of second frame 40 (as it is coupled to towing vehicle). In this embodiment, third frame 60 is coupled to second frame 40 via pivot subassembly 200 and moves with second frame 40. However, pivoting arms 80 prevent third frame 60 from moving in a linear fashion horizontally and rather, drive the rear portion of third frame 60 toward the ground thereby translating the horizontal movement of third frame to pivotal movement as depicted in FIG. 10B. The third frame continues to pivot or tilt about pivot subassembly 200 until the tow vehicle ceases backward movement. Thus, the third frame 60 can tilt or pivot to any degree and at any speed desired by the driver, which provides a significant advantage over previous designs. Once the payload is removed from trailer bed 62, the driver simply pulls the tow vehicle forward thereby returning third frame 60 to its original resting position and causing the front roller subassemblies 100 to contact flange 27 of the front lateral support beam 25b, thus preventing any further forward movement of second frame 40 relative to first frame 20. The driver then releases the trailer brake and proceeds on his way. In an alternative embodiment not shown, dump trailer can further comprise a pinable hatch or any type of locking device that could hold the second frame in place and prevent incidental horizontal movement during towing.

Figure 11A:
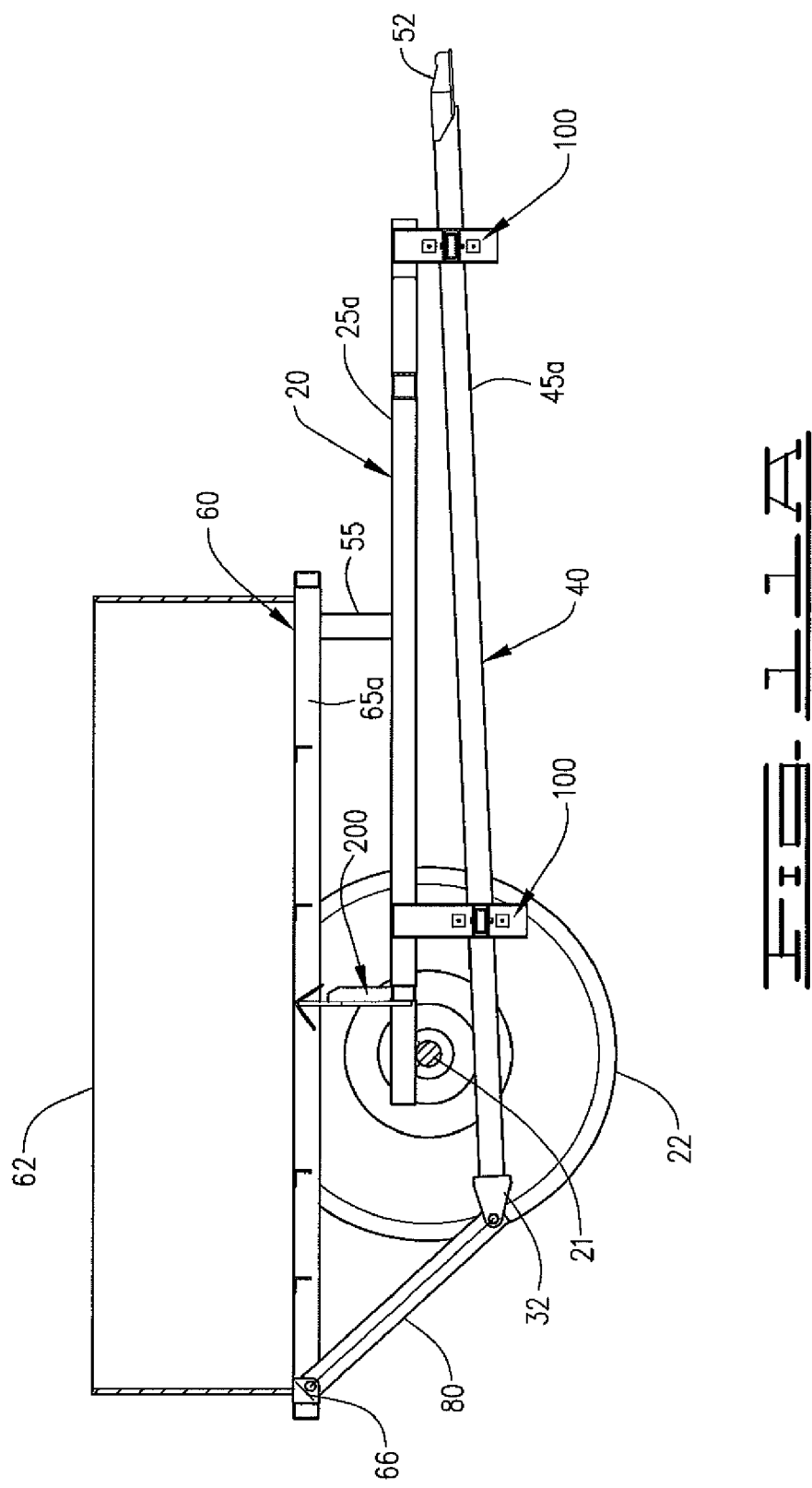
FIG. 11A is a side cross-sectional view of a third embodiment of the dump trailer in a tow position.

FIGS. 11A and B depict a preferred embodiment of a forward-dumping configuration. The primary difference is that second frame 40 is disposed below first frame 20 and provides the attachment site for pivoting arm 80. In this configuration, upon immobilization of first frame 20, the driver pulls the tow vehicle forward causing second frame 40 to be displaced horizontally relative to first frame 20. As the second frame 40 moves forward, pivoting arm 80 pulls the rear portion of third frame 60 toward the ground, causing third frame 60 to pivot or tilt about pivot subassembly 200. It should be noted in this embodiment, third frame 60 is not displaced horizontally during the dumping action.

Although preferred embodiments have been illustrated and described in detail, the foregoing disclosure is not intended to unduly limit or restrict the spirit and scope of the invention set forth in the following claims.

What is claimed is:

1. A dump trailer comprising:
    a first frame, the first frame bearing one or more sets of wheels;
    a second frame, the second frame comprising an attachment device to permit coupling to a towing vehicle;
    a third frame positioned above the first and second frames and providing support for a trailer bed;
    one or more roller subassemblies positioned between the first frame and the second frame, wherein the roller subassemblies permit forward and rearward movement of the second frame relative to the first frame;
    one or more pivot subassemblies, wherein the one or more pivot subassemblies permit the third frame to pivot as the second frame moves forward and rearward relative to the first frame;
    one or more pivoting arms, wherein the one or more pivoting arms cause the third frame to pivot about the one or more pivot subassemblies as the second frame moves forward and rearward relative to the first frame.

2. The dump trailer of claim 1, wherein the first, second and third frames comprise one or more longitudinal support beams and at least one lateral support beam extending between the longitudinal support beams.

3. The dump trailer of claim 2, wherein the second frame is positioned between the first frame and the third frame.

4. The dump trailer of claim 3, wherein the one or more roller subassemblies comprise a pair of attachment plates, an upper roller, and a lower roller, wherein the pair of attachment plates are coupled to a longitudinal support beam of the second frame and extend downward and flank opposite vertical side surfaces of a longitudinal support beam of the first frame, wherein the upper roller is positioned between and contacts a lower horizontal surface of said longitudinal support beam of the second frame and an upper horizontal surface of said longitudinal support beam of the first frame, and wherein the lower roller is positioned such that it contacts the lower horizontal surface of said longitudinal support beam of the second frame.

5. The dump trailer of claim 4, wherein the one or more roller subassemblies further comprise a pair of side rollers, wherein the side rollers traverse an opening in the attachment plate and contact opposite vertical side edges of said longitudinal support beam of the first frame.

6. The dump trailer of claim 3, wherein the one or more pivot subassemblies comprise a rocker plate and an angle iron, wherein the rocker plate extends from the second frame and provides an upper edge for contacting the angle iron, wherein the angle iron is coupled to the third frame and defines an apex for contacting the upper edge of the rocker plate, and wherein the upper edge of the rocker plate is positioned in the apex of the angle iron such that the third frame pivots about the interface between the upper edge of the rocker plate and the apex of the angle iron.

7. The dump trailer of claim 3, wherein the one or more pivoting arms extend from the first frame to the third frame.

8. The dump trailer of claim 1, further comprising an electric brake system, wherein the first frame is immobilized upon activation of the electric brake system, and wherein the third frame is moved from a resting position to a dumping position upon rearward movement of the second frame relative to the immobilized first frame.

9. The dump trailer of claim 1, wherein the first frame is located between the second frame and the third frame.

10. The dump trailer of claim 9, wherein the one or more pivot subassemblies comprise a rocker plate and an angle iron, wherein the rocker plate extends up from the first frame and provides an upper edge for contacting the angle iron, wherein the angle iron is coupled to the third frame and defines an apex for contacting the upper edge of the rocker plate, and wherein the upper edge of the rocker plate is positioned in the apex of the angle iron such that the third frame pivots about the interface between the upper edge of the rocker plate and the apex of the angle iron.

11. The dump trailer of claim 9, wherein the one or more pivoting arms extend from the second frame to the third frame.

12. The dump trailer of claim 1, further comprising an electric brake system, wherein the first frame is immobilized upon activation of the electric brake system, and wherein the third frame is moved from a resting position to a dumping position upon forward movement of the second frame relative to the immobilized first frame.

13. The dump trailer of claim 1, wherein the one or more pivot subassemblies comprise an outer pipe and an inner pipe, wherein the outer pipe is of a diameter that permits the inner pipe to be placed inside the outer pipe, and wherein the inner pipe is rotatable within the outer pipe to permit pivotal movement of the third frame.

14. The dump trailer of claim 13, wherein said outer pipe is mounted on a post coupled to the second frame and said inner pipe is coupled on each end to a pair of flanges extending downward from the third frame.

15. A dump trailer comprising:
- a first frame, the first frame comprising a pair of longitudinal support beams, one or more lateral support beams disposed between the pair of longitudinal support beams, and one or more axles each bearing a set of wheels;
- a second frame positioned above the first frame, the second frame comprising a pair of longitudinal support beams, one or more lateral support beams disposed between the pair of longitudinal support beams, a tongue extending from each longitudinal support beam coupled to a hitch for attaching to a towing vehicle;
- a third frame positioned above the second frame, the third frame comprising a pair of longitudinal support beams, a plurality of lateral support beams disposed between the pair of longitudinal support beams;
- one or more roller subassemblies positioned between the first and second frames, wherein the roller subassemblies permit forward and rearward movement of the second frame relative to the first frame;
- one or more pivot subassemblies disposed between the second and third frames, wherein the one or more pivot subassemblies permit the third frame to pivot as the second frame moves forward and rearward relative to the first frame;
- one or more pivoting arms, wherein the one or more pivoting arms extend between the first frame and third frame, and wherein the one or more pivoting arms cause the third frame to pivot about the one or more pivot subassemblies as the second frame moves forward and rearward relative to the first frame.

16. The dump trailer of claim 15, wherein the one or more pivot subassemblies comprise a rocker plate and an angle iron, wherein the rocker plate extends up from the second frame and provides an upper edge for contacting the angle iron, wherein the angle iron is coupled to the third frame and defines an apex for contacting the upper edge of the rocker plate, and wherein the upper edge of the rocker plate is positioned in the apex of the angle iron such that the third frame pivots about the interface between the upper edge of the rocker plate and the apex of the angle iron.

17. The dump trailer of claim 15, wherein the one or more pivot subassemblies comprise an outer pipe and an inner pipe, wherein the outer pipe is of a diameter that permits the inner pipe to be placed inside the outer pipe, and wherein the inner pipe is rotatable within the outer pipe to permit pivotal movement of the third frame.

18. The dump trailer of claim 17, wherein said outer pipe is mounted on a post coupled to the second frame and said inner pipe is coupled on each end to a pair of flanges extending downward from the third frame.

19. The dump trailer of claim 15, further comprising an electric brake system, wherein the first frame is immobilized upon activation of the electric brake system, and wherein the third frame is moved from a resting position to a dumping position upon rearward movement of the second frame relative to the immobilized first frame.

20. A dump trailer comprising:
- a first frame, the first frame comprising a pair of parallel longitudinal support beams, one or more lateral support beams disposed between the pair of longitudinal support beams, and one or more axles each bearing a set of wheels;
- a second frame positioned below the first frame, the second frame comprising one or more longitudinal support beams and an attachment device for coupling to a towing vehicle;
- a third frame positioned above the first frame, the third frame comprising a pair of parallel longitudinal support beams, a plurality of lateral support beams disposed between the pair of parallel longitudinal support beams;
- one or more roller subassemblies positioned between the first and second frames, wherein the roller subassemblies permit forward and rearward movement of the second frame relative to the first frame;
- one or more pivot subassemblies disposed between the first and third frames, wherein the one or more pivot subassemblies permit the third frame to pivot as the second frame moves forward and rearward relative to the first frame;
- one or more pivoting arms, wherein the one or more pivoting arms extend between the second frame and third frame, and wherein the one or more pivoting arms cause the third frame to pivot about the one or more pivot subassemblies as the second frame moves forward and rearward relative to the first frame.

* * * * *